March 8, 1966     S. C. WORDEN     3,239,241
LEVER EXTENSION FOR TRAILER FIFTH WHEEL
Filed June 22, 1964
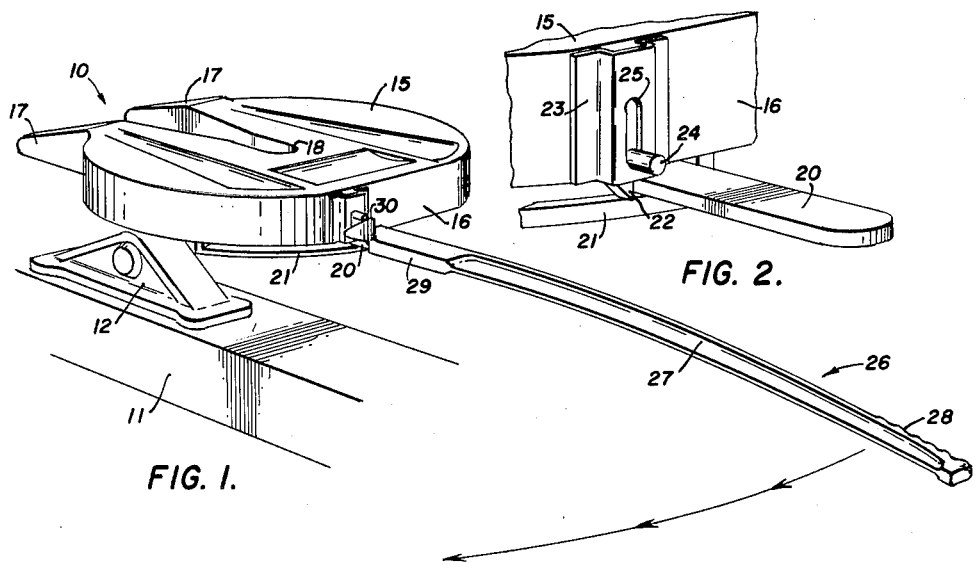
FIG. 1.
FIG. 2.
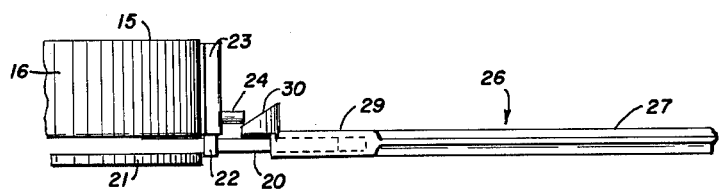
FIG. 3.
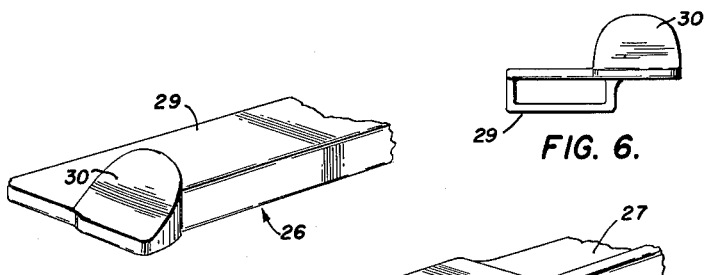
FIG. 4.
FIG. 5.
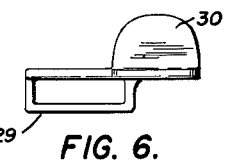
FIG. 6.
SUMMIE C. WORDEN
INVENTOR.
BY *Herbert J. Brown*
ATTORNEY

United States Patent Office

3,239,241
Patented Mar. 8, 1966

3,239,241
LEVER EXTENSION FOR TRAILER
FIFTH WHEEL
Summie C. Worden, 2009 Salem, Irving, Tex.
Filed June 22, 1964, Ser. No. 377,020
1 Claim. (Cl. 280—434)

This invention relates to lever extensions for fifth wheels and has reference to improvements in the lever extension illustrated and described in my copending application, Serial No. 356,743, filed April 2, 1964.

Fifth wheels, as herein referred to, are mounted on the frames of automotive tractors between the rear wheels thereof for pivotally engaging and supporting the forward ends of trailers. Connection between the tractor and the trailer is by means of a depending king pin beneath and near the forward end of the trailer, and which pin is locked in a central opening in the fifth wheel. Rearwardly extending diverging legs, which are integral parts of the fifth wheel, define a slot communicating with the opening through which slot the king pin moves when removing the trailer from the tractor. To release the king pin from the tractor, there is a short forwardly extending coupler lever which is normally held in locked position by a vertically movable latch having a forwardly projecting pin. To release the king pin, the latch is raised by means of the pin, and the coupler lever is moved in a counterclockwise direction. The latch and lever, being located between the tractor wheels and beneath the trailer, are rather inaccessible, and because the lever is short it is sometimes difficult to operate.

The lever extension described in the referred to copending application provides means whereby the short lever is readily accessible, provides additional leverage, and at the same time provides means for raising the referred to latch. The prior construction has three moving parts, namely, a bell crank for lifting the latch, an operating lever near the extending end of the extension arm, and an actuating rod connecting the operating lever with the bell crank.

The primary object of the present invention is to provide a lever extension for the described purpose without any moving parts, yet capable of lifting the locking latch of a fifth wheel and at the same time providing additional leverage for operating the fifth wheel coupler lever.

Other objects will become apparent from the following description and the accompanying drawings, wherein:

FIGURE 1 is a perspective view of a fifth wheel mounted on the frame of an automotive tractor and showing the present lever extension applied to the fifth wheel coupling lever.

FIGURE 2 is an enlarged fragmentary perspective view of the forward portion of a fifth wheel and particularly showing the coupler lever and latch, both of which are conventional.

FIGURE 3 is a fragmentary side elevational view of the forward portion of a fifth wheel and the present lever extension positioned on the coupler lever, and particularly showing the cam on the lever extension for raising the latch pin.

FIGURE 4 is an enlarged fragmentary perspective view of the end of the extension arm including the latch lifting cam.

FIGURE 5 is a view similar to FIGURE 4, but showing the extension lever in its inverted position, and FIGURE 6 is an end view of the extension lever showing the relative positions of the coupler lever receiving socket and the latch lifting cam.

In the drawing, the numeral 10 generally designates a fifth wheel mounted on the frame 11 of an automotive tractor, not shown. The fifth wheel includes bolsters 12 on each side thereof which are secured to the frame 11. Apart from the bolsters 12, the fifth wheel 10 shown includes a generally circular top plate 15, a depending flange 16 therearound and diverging downwardly sloped and rearwardly extending legs 17. At the center of the top plate 15 there is an opening 18 for receiving the king pin, not shown, which depends from beneath the forward center portion of the trailer.

The coupling mechanism for engaging the king pin is conventional and comprises no part of the present invention; however, the usual coupling lever 20 for operating such mechanism is shown in FIGURE 3. In its closed position the coupler lever 20 projects forwardly of the flange 16, and in its open or disengaged position it is rotated to one side in the direction shown by means of arrows in FIGURE 1.

To limit the rotation of the lever 20, and to serve as a support therefor, there is a bracket 21 beneath the forward and side lower edge of the flange 16. To secure the lever 20 in its forward locked position, there is a vertically slidable downwardly extensible latch 22 mounted in a slide 23 on the flange 16, and which latch engages the lever on the side thereof including the greater length of the bracket 21. The latch 22, which is spring loaded to urge the same downwardly, has a projecting pin 24 which, when raised, releases the lever 20. The pin 24 operates in a vertical slot 25 in the slide 23.

The present invention is directed to an extension lever, generally designated at 26, for operating the coupling lever 20 and the latch 22. The extension lever 26 includes an elongate arm 27, a hand grip 28 on the handle end of the arm and a socket 29 on the other end. The socket 29 is shaped to slidably receive the extending portion of the coupling lever 20.

The improvement of the present invention is directed to a cam 30 integral with the socket 29 on the side thereof and forwardly of its end to align with the lift pin 24 on the latch 22. The cam 30 slopes upwardly and rearwardly. As the socket 29 slides along the coupler lever 20 it contacts and raises the pin 24 and thereby raises the latch 22. The coupler lever 20 is thereby released and the lever extension 26 is moved in the direction shown by arrows, FIGURE 1, to release the king pin.

The invention is not limited to the exemplary construction herein shown and described, but may be made in various ways within the scope of the appended claim.

What is claimed is:

An extension lever for a fifth wheel having a projecting coupling lever and a vertically slidable latch alongside thereof and having a projecting pin for raising said latch, said extension lever consisting of: an elongate arm having a handle end, a socket on said arm on the end thereof opposite said handle end, and a stationary cam integral with and transversely positioned on said socket positioned to engage said pin and operate said latch.

References Cited by the Examiner

UNITED STATES PATENTS 2,581,254    1/1952    Greenawalt _____ 280—434

LEO FRIAGLIA, *Primary Examiner.*